US011190920B2

(12) United States Patent
Juntunen et al.

(10) Patent No.: US 11,190,920 B2
(45) Date of Patent: Nov. 30, 2021

(54) BLUETOOTH USING SECONDARY CHANNEL

(71) Applicant: Ademco Inc., Golden Valley, MN (US)

(72) Inventors: Robert D. Juntunen, Minnetonka, MN (US); Bertrand Jean Michel Debever, Le Cannet (FR); Nagaraj Chickmagalur Lakshminarayan, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/831,422

(22) Filed: Mar. 26, 2020

(65) Prior Publication Data

US 2021/0306832 A1    Sep. 30, 2021

(51) Int. Cl.
| | | |
|---|---|---|
| *H04B 7/00* | (2006.01) | |
| *H04W 4/80* | (2018.01) | |
| *H04W 76/10* | (2018.01) | |
| *H04W 72/04* | (2009.01) | |

(52) U.S. Cl.
CPC ............ *H04W 4/80* (2018.02); *H04W 72/04* (2013.01); *H04W 76/10* (2018.02)

(58) Field of Classification Search
CPC ........ H04W 4/80; H04W 76/10; H04W 72/04
USPC ........................................................ 455/41.2
See application file for complete search history.

(56) References Cited

U.S. PATENT DOCUMENTS

| 9,978,237 B2* | 5/2018 | Britt | .................... | G08B 19/00 |
| 2007/0090996 A1* | 4/2007 | Wang | .................... | H04L 67/12 |
| | | | | 342/463 |
| 2012/0166338 A1* | 6/2012 | Agnelli | .................... | H04L 67/34 |
| | | | | 705/44 |
| 2013/0320080 A1* | 12/2013 | Olson | .................... | G07F 7/0833 |
| | | | | 235/380 |
| 2014/0324410 A1* | 10/2014 | Mathews | .............. | H04L 12/283 |
| | | | | 703/22 |

(Continued)

FOREIGN PATENT DOCUMENTS

| CN | 103596191 A | 2/2014 |
| EP | 2757837 A1 | 7/2014 |

(Continued)

OTHER PUBLICATIONS

International Search Report and Written Opinion of International Application No. PCT/US2021/024210, dated Jul. 9, 2021, 10 pp.

*Primary Examiner* — April G Gonzales
(74) *Attorney, Agent, or Firm* — Fredrikson & Byron, P.A.

(57) ABSTRACT

A device includes communication circuitry configured to establish, with an external device, a wireless channel according to a connection protocol and exchange, via the wireless channel and with the external device, network parameters for establishing a BLUETOOTH channel that is different from the wireless channel. The BLUETOOTH channel is established according to a BLUETOOTH protocol different from the connection protocol. The communication circuitry is further configured to establish, with the external device, the BLUETOOTH channel using the network parameters. To establish the BLUETOOTH channel, the communication circuitry is configured to refrain from advertising the network parameters via the BLUETOOTH channel. The communication circuitry is further configured to exchange, via the BLUETOOTH channel and with the external device, data.

20 Claims, 4 Drawing Sheets

(56) References Cited

U.S. PATENT DOCUMENTS

| | | | |
|---|---|---|---|
| 2014/0375428 A1* | 12/2014 | Park | H04L 67/22 340/10.1 |
| 2015/0356332 A1* | 12/2015 | Turner | G01S 5/0226 340/10.5 |
| 2017/0055199 A1* | 2/2017 | Petersen | H04W 40/28 |
| 2017/0223615 A1* | 8/2017 | Lee | H04W 36/03 |
| 2017/0230810 A1 | 8/2017 | Banerjea | |
| 2017/0332049 A1* | 11/2017 | Zhang | H04W 4/80 |
| 2018/0041959 A1* | 2/2018 | Yang | H04W 52/0216 |
| 2019/0250899 A1 | 8/2019 | Riedl et al. | |
| 2019/0281371 A1* | 9/2019 | Klicpera | H04L 12/2827 |
| 2019/0380018 A1* | 12/2019 | Tian | H04W 76/11 |

FOREIGN PATENT DOCUMENTS

| | | |
|---|---|---|
| WO | 2016160215 A1 | 10/2016 |
| WO | 2019067105 A1 | 4/2019 |

\* cited by examiner

BLUETOOTH USING SECONDARY CHANNEL

TECHNICAL FIELD

This disclosure relates to networks used in, for example, home monitoring systems, comfort systems, and security systems.

BACKGROUND

A device may periodically advertise network parameters on a first frequency channel of BLUETOOTH compliant channels. The device may establish a connection with another device using the network parameters. Once established the device can transmit data using a second frequency channel of the of BLUETOOTH compliant channels that is different from the first frequency channel. The device may transmit the data at using the second frequency channel of the BLUETOOTH compliant channels at an output power that is compliant with local regulations and that maximizes a quality of service (e.g., speed, reliability, etc.) for transmitting data to and from the device on the BLUETOOTH compliant channels.

SUMMARY

In general, this disclosure relates to systems, devices, and techniques for establishing a high bandwidth connection (e.g., a BLUETOOTH channel) in a scheduled stream (e.g., a scheduled BLUETOOTH stream). For example, a device may exchange network parameters for establishing a high bandwidth connection using a secondary wireless channel (or simply, "a wireless channel"), such as, for example, an IEEE 802.15.4 connection, and not a BLUETOOTH channel. In this example, the device may establish the high bandwidth connection using the network parameters exchanged on the wireless channel rather than advertise the network parameters using a channel of the high bandwidth connection (e.g., rather advertise the network parameters using the BLUETOOTH channel). As such, the device may establish a high bandwidth connection in a scheduled stream using a secondary wireless channel, which may allow the high bandwidth connection to use a higher power compared to systems that establish the high bandwidth connection using a channel of the high bandwidth connection.

In some examples, a device includes communication circuitry configured to: establish, with an external device, a wireless channel according to a connection protocol; exchange, via the wireless channel and with the external device, network parameters for establishing a BLUETOOTH channel that is different from the wireless channel, wherein the BLUETOOTH channel is established according to a BLUETOOTH protocol different from the connection protocol; establish, with the external device, the BLUETOOTH channel using the network parameters, wherein, to establish the BLUETOOTH channel, the communication circuitry is configured to refrain from advertising the network parameters via the BLUETOOTH channel; and exchange, via the BLUETOOTH channel and with the external device, data.

In some examples, a method includes establishing, by communication circuitry of a device and with an external device, a wireless channel according to a connection protocol; exchanging, by the communication circuitry, via the wireless channel, and with the external device, network parameters for establishing a BLUETOOTH channel that is different from the wireless channel, wherein the BLUETOOTH channel is established according to a BLUETOOTH protocol different from the connection protocol; establishing, by the communication circuitry and with the external device, the BLUETOOTH channel using the network parameters, wherein, to establish the BLUETOOTH channel, the communication circuitry is configured to refrain from advertising the network parameters via the BLUETOOTH channel; and exchanging, by the communication circuitry, via the BLUETOOTH channel, and with the external device, data.

A system includes: a hub device; and a sensor device configured to generate sensor data; wherein the hub device comprises communication circuitry configured to: establish, with the sensor device, a wireless channel according to a connection protocol; exchange, via the wireless channel and with the sensor device, network parameters for establishing a BLUETOOTH channel that is different from the wireless channel, wherein the BLUETOOTH channel is established according to a BLUETOOTH protocol different from the connection protocol; establish, with the sensor device, the BLUETOOTH channel using the network parameters, wherein, to establish the BLUETOOTH channel, the communication circuitry is configured to refrain from advertising the network parameters via the BLUETOOTH channel; and receive, via the BLUETOOTH channel and with the sensor device, the sensor data.

The details of one or more examples of the disclosure are set forth in the accompanying drawings and the description below. Other features, objects, and advantages will be apparent from the description, drawings, and claims.

DETAILED DESCRIPTION

Figure 1A:
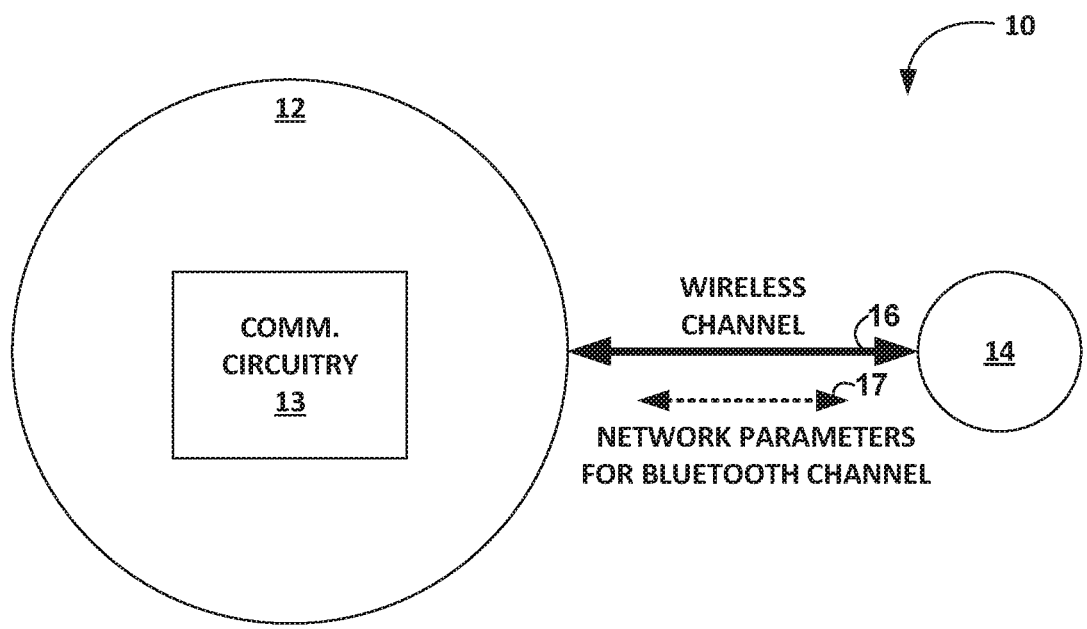
FIG. 1A is a conceptual diagram illustrating a device establishing a wireless channel and exchanging network parameters, in accordance with some examples of this disclosure.

Modern residential buildings or other buildings may include a central "hub" device configured to manage one or more systems within the building, such as monitoring systems, comfort systems, or other security systems. The hub device may be in wireless communication with a number of other devices placed throughout the building. For example, the central hub device may wirelessly receive sensor data from any number of different sensors, such as motion sensors, air quality and/or temperature sensors, infrared sensors, or door and/or window contact sensors. Additionally, the central hub device may wirelessly transmit commands or instructions to one or more controllable devices.

For example, the central hub device may instruct a thermostat to adjust a temperature within the building, or in another example, may command a damper to open or close an air vent.

In some applications for managing one or more systems within a building, BLUETOOTH radio communication techniques may have an advantage over other radio connection techniques such as, for example, IEEE 802.15.4 radio communication techniques. BLUETOOTH radio communications techniques may support high data rates and throughput compared to IEEE 802.15.4 radio communication techniques. For example, BLUETOOTH may have a base bandwidth of, for example, 1 Mbps, 2 Mbps) and IEEE 802.15.4 may have a base bandwidth, for example, of 250 kbps. That is, for a given link budget, BLUETOOTH may have a bandwidth of 1 Mbps and IEEE 802.15.4 may have a bandwidth of 250 kbps. As used herein link budget may refer to power gains and losses that a communication signal experiences when transmitted through a medium (e.g., free space, walls, signal noise etc.).

From a range perspective, BLUETOOTH radio techniques and IEEE 802.15.4 radio communication techniques may have nearly equal link budget. In some examples, BLUETOOTH may have a join time (e.g., latency) of greater than 1 second (e.g., 3 seconds) and IEEE 802.15.4 may have a join time of less than 1 second (e.g., 30 milliseconds (ms)).

As used herein, BLUETOOTH may refer to present and future versions of BLUETOOTH. Examples of BLUETOOTH include classic BLUETOOTH (e.g., Versions 1.0, 1.0B, 1.1, 1.2, 2.0, 2.1, 3.0, 4.0, 4.1, 4.2, 5, 5.1, etc.), BLUETOOTH-low energy (e.g., Versions 4.0, 4.1, 4.2, 5, 5.1, etc.), and other types of BLUETOOTH. As such, all instances of "BLUETOOTH" herein should be interpreted as including classic BLUETOOTH and/or BLUETOOTH-low energy. BLUETOOTH may operate at frequencies between 2.402 and 2.480 GHz, 2.400 and 2.4835 GHz including a 2 MHz wide guard band and a 3.5 MHz wide guard band, or another frequency range.

BLUETOOTH LE has three advertising channels (37-39) and 37 data channels (0-36), each with a 2 MHz spacing. Classic BLUETOOTH has 79 1 MHz channels, with 32 channels for advertising. IEEE 802.11 (e.g., b, g, n, etc.) use the same frequency space divided into 14 overlapping channels spaced 5 MHz apart. BLUETOOTH LE advertising channels fit into the gaps created between the Wi-Fi channels 1, 6, and 11. Each frequency channel of classic BLUETOOTH channels may have a 5 MHz spacing. In some examples, each frequency channel of a wireless channel (e.g., an IEEE 802.15.4 channel) may have a center frequency different from a central frequency of a neighboring channel by greater than 1 MHz (e.g., 2 MHz, 5 MHz, etc.).

As used herein, BLUETOOTH may refer to communications that use frequency hopping, such as, for example, frequency-hopping spread spectrum, to avoid interference from other radio communications. For example, a device using a BLUETOOTH channel may operate a BLUETOOTH LE channel that hops between 3 frequency channels when using advertising channels and 37 frequency channels when operating without advertising channels. In contrast, IEEE 802.15.4 may instead use a direct sequence spread spectrum technique. For example, a device may establish a wireless channel using IEEE 802.15.4 by mixing a signal signaling data for the wireless channel with a pseudo-random code which is then extracted by a receiver from an external device. Direct sequence spread spectrum may help to enhance the signal-to-noise ratio by spreading the transmitted signal across a wide band. In some examples, a device establishing a wireless channel using IEEE 802.15.4 may be configured to scan for a clear spectrum.

Radio communications may generally be regulated by regional restrictions. For example, BLUETOOTH radio communication techniques may have a maximum power output. However, in some examples, such restrictions on a maximum power output may reduce an effectiveness of radio communications. For instance, the maximum power output on BLUETOOTH radio communication techniques may reduce or remove one or more advantages of using a dual network (e.g., a network configured for BLUETOOTH radio communication and IEEE 802.15.4 radio communication). For instance, maximum power output for classic BLUETOOTH may be limited to less than 30 dBm, less than 20 dBm, less than 10 dBm, or another maximum power output. Maximum power output for BLUETOOTH LE may be limited to less than 20 dBm, less than 10 dBm, or another maximum power output.

For example, some standards may specify how to establish a connection that allows data streaming between two nodes via advertising mode. However, in some examples, the advertising mode may not spread energy sufficiently between frequency channels for the standard-compliant connection. For instance, BLUETOOTH-low energy (BTLE, also known as "BLE") may use only three frequencies channels to spread energy for a BTLE-compliant connection. Moreover, devices configured for the standard may also be configured to comply with regulations for output power. As such, a device may not spread energy sufficiently between frequency channels to comply with a standard and may also reduce output power to maintain compliance with the regulations.

In accordance with the techniques of the disclosure, a device may be configured to generate a "custom" channel compliant with a standard instead of relying on an advertising mode. For instance, rather than relying on an advertising mode in the BLUETOOTH protocol, a device may use a wireless channel different from a BLUETOOTH channel (e.g., IEEE 802.15.4) to exchange network parameters for the custom connection. In this way, the device may establish a BLUETOOTH channel that is compliant with the BLUETOOTH standard while permitting efficient energy spreading among frequency channels for the BLUETOOTH channel, which may result in a higher quality of service (e.g., speed, reliability, etc.) for transmitting data to and from the device on the BLUETOOTH channel compared to systems using advertising mode. For example, techniques described herein may configure a device to refrain from using an advertising channel technique (e.g., the BLUETOOTH advertising mode) and to deliver the content (e.g., network parameters) that the advertising exchange provides during the advertising channel technique using a concurrent wireless channel (e.g., IEEE 802.15.4).

The device may be configured to generate the "custom" channel using authentication information (e.g., a passkey) and/or encryption information (e.g., an encryption key) using a wireless channel different from a BLUETOOTH channel (e.g., IEEE 802.15.4). For example, a human user may validate a device and securely bind the device with a hub device to establish the wireless channel. For instance, the human user may confirm a IEEE 802.15.4 channel is valid by entering a passkey displayed on the device (e.g., a unique code printed on the edge device) into a user interface of the hub device to validate and bind the IEEE 802.15.4 channel between the device and the hub device. This may represent an out-of-band validation step to help to defeat a cyber-attack known as "Man in the Middle." In this example, rather than the human user again validating the device to securely establish and encrypt the BLUETOOTH channel, the device may use the wireless channel (e.g., IEEE 802.15.4) to exchange authentication information and encryption information for the BLUETOOTH channel. Examples of encryption information for establishing a BLUETOOTH channel between a first device and a second device may include, but are not limited to, for example, a private key for the first device and/or the second device, a public key for the first device and/or the second device, or other encryption information.

FIG. 1A is a conceptual diagram illustrating a device establishing a wireless channel and exchanging network parameters, in accordance with some examples of this disclosure. While system 10 illustrates only device 12 and device 14, system 10 may include additional devices (e.g., devices in wireless communication with each other). System 10 may be installed within a building and the surrounding premises (referred to collectively in this disclosure as a "premise").

Device 12 may include a computing device configured to operate one or more systems within a building, such as comfort, security, and/or safety systems. For example, as described further below, device 12 may include at least a memory and processor configured to receive data, such as received from one or more devices and/or from user input, and process the data in order to automate one or more systems within a building. For example, device 12 may automate, control, or otherwise manage systems including heating and cooling, ventilation, illumination, or authorized access to individual rooms or other regions, as non-limiting examples. For example, device 12 may include a "Life and Property Safety Hub®" of Resideo Technologies, Inc.®, of Austin, Tex. Hub device 12 may include a wired connection to an electric power grid, but in some examples may include an internal power source, such as a battery, supercapacitor, or another internal power source. Device 12 may include communication circuitry 13 ("COMM. CIRCUITRY") configured to establish wireless channel 16.

Device 14, which may also be referred to herein as "external device 14," may include a sensor device. Device 14 is external to device 12 such that communications between device 12 and device 14 may be performed using wireless channel 16, BLUETOOTH channel 18 of FIG. 1B, or another wireless channel. A sensor device may be configured to collect or generate sensor data, and transmit the sensor data to device 12 for processing. In some examples, device 14 may include a controllable device external to device 12. A controllable device may be configured to perform a specified function when the controllable device receives instructions (e.g., a command or other programming) to perform the function from device 12. Examples of different types of device 14 are included in the description of FIG. 2, below, and the examples of device 14 in FIG. 2 are all examples of an "external device". Additional examples of device 14 as external devices are possible and the examples illustrated in FIG. 2 should not be considered limiting. Device 14 may include either a wired connection to an electric power grid or an internal power source, such as a battery, supercapacitor, or another internal power source. While the example of FIG. 1A discusses device 12 as including a hub device and device 14 as including a sensor device, in some examples, device 12 may include a sensor device and device 14 may include a hub device.

Communication circuitry 13 may be configured to establish wireless channel 16 between hub device 12 and device 14 to conform to a connection protocol, such as, for example, wireless channel protocol (e.g., a low-power wireless channel protocol). Wireless channel 16 is not a BLUETOOTH channel. Examples of a low-power connection protocol may include, but are not limited to, IEEE 802.15.4, a low power protocol using a 900 MHz frequency band, or another low-power connection protocol. As used herein, IEEE 802.15.4 may include any standard or specification compliant with IEEE 802.15.4, such, as for example, Zigbee™, ISA100.11a™, WirelessHART™, MiWi™, 6LoWPAN™, Thread™ SNAP™, and other standards or specifications that are compliant with IEEE 802.15.4. That is, for example, IEEE 802.15.4 should be interpreted herein as including implementations relying only on the IEEE 802.15.4 standard as well as implementations that build upon the IEEE 802.15.4 standard with additional specifications, such as, for example, Zigbee™. In some examples, wireless channel 16 may conform to another connection protocol, such as, for instance, IEEE 802.11, commonly referred to as Wi-Fi™.

Although FIG. 1A shows device 12 as directly connected to device 14 via wireless channel 16, in some examples, system 10 may include one or more intermediate devices that are each configured to act as an intermediary or "repeater" device. For example, wireless channel 16 may represent a wireless channel established using one or more intermediary devices configured in a mesh network, a star network, or another network.

Device 12 and device 14 may exchange network parameters for a BLUETOOTH channel. While various examples described herein use BLUETOOTH as an example of a high-bandwidth channel, in some examples, other high-bandwidth channels may be used. In some examples, device 12 may transmit the network parameters to device 14 and device 14 may receive the network parameters from device 12. In other examples, device 14 may transmit the network parameters to device 12 and device 12 may receive the network parameters from device 14.

Network parameters 17 may include one or more network parameters for establishing a BLUETOOTH channel. In instances where wireless channel 16 is an IEEE 802.15.4 channel, device 12 and/or device 14 may use wireless channel 16 (e.g., an 802.15.4 network) and application code base to detect that a need for a BLUETOOTH connection exists. Again, wireless channel 16 is not a BLUETOOTH channel. After the application event has triggered, wireless channel 16 (e.g., an 802.15.4 network) may pass all of the needed network parameters 17 for the BLUETOOTH connection event to occur to allow the so called scheduled "BLUETOOTH stream" (also referred to herein as "BT stream") to occur. Examples of network parameters that may be exchanged between device 12 and device 14 may include, for example, but are not limited to, one or more of: (1) a media access control (MAC) address of a master device (e.g., device 12 or device 14) and a MAC address of a client device (device 14 or device 12); (2) a real time-point in time for the transfer to start (or offset from 802.15.4 start command); (3) an indication of a starting frequency; (4) an indication of a hop set; (5) a connection interval; or (6) a connection latency. In some examples, device 12 and device 14 may exchange authentication information (e.g., a passkey) and/or encryption information (e.g., an encryption key) for a BLUETOOTH channel using wireless channel 16.

Figure 1B:
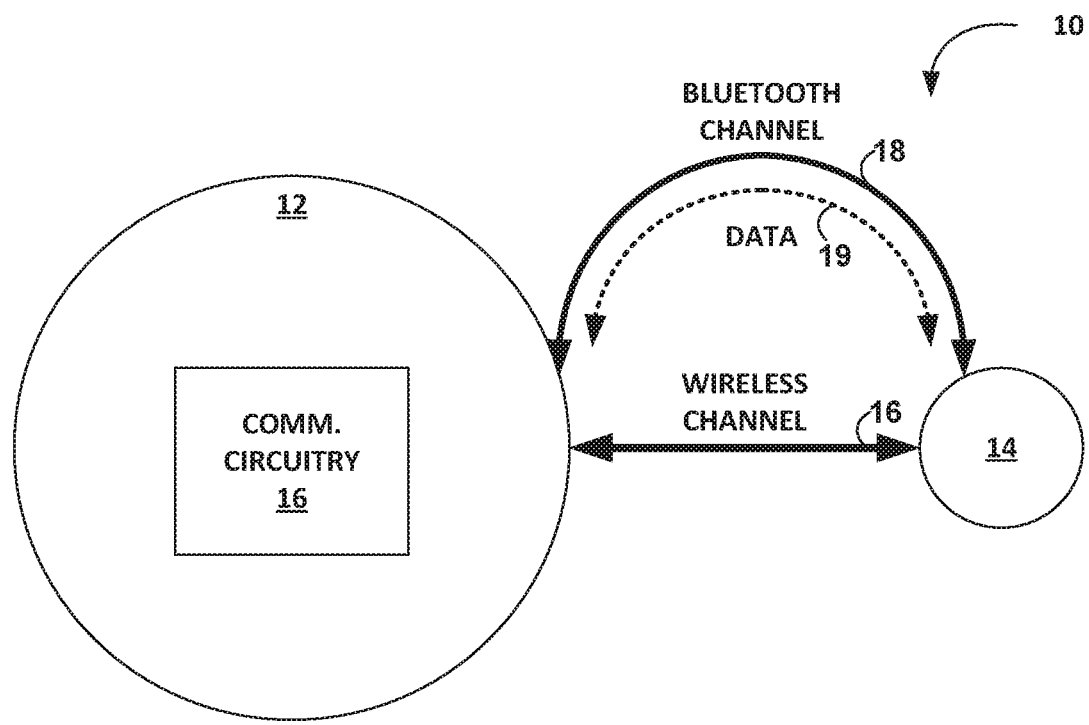
FIG. 1B is a conceptual diagram illustrating the device of FIG. 1A establishing a BLUETOOTH channel and exchanging data, in accordance with some examples of this disclosure.
Figure 2:
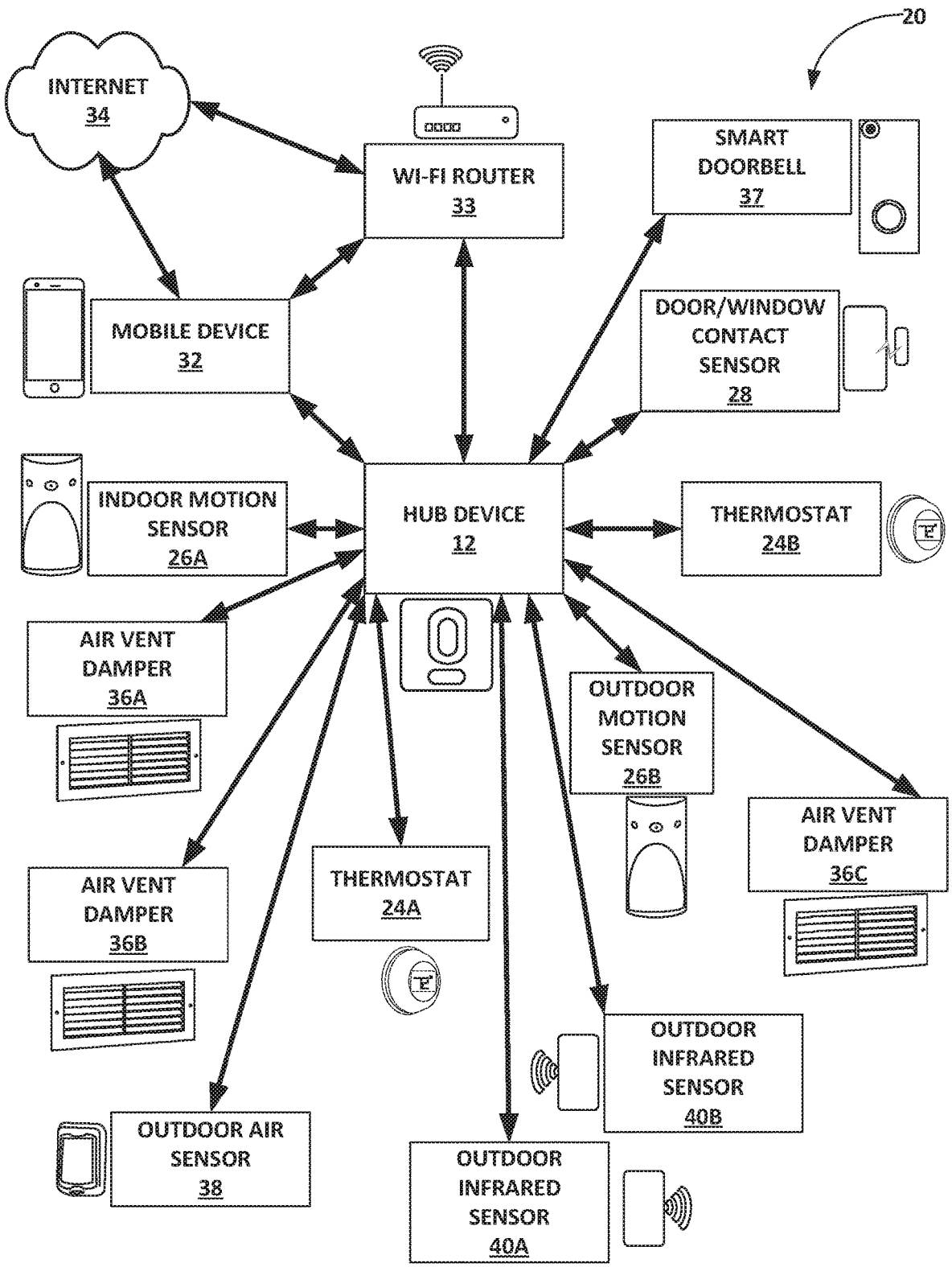
FIG. 2 is a conceptual block diagram illustrating an example of the networked system of FIG. 1, in accordance with some examples of this disclosure.

FIG. 1B is a conceptual diagram illustrating the device of FIG. 1A establishing a BLUETOOTH channel 18 and exchanging data 19, in accordance with some examples of this disclosure. In the example of FIG. 1B, network parameters 17 have been exchanged between device 12 and device 14. In this example, device 12 and device 14 may "wake" at the correct moment in time and start following a hop sequence that can effectively create a high power BT stream event using adaptive frequency hopping. In this way, BLUETOOTH channel 18 may effectively spread energy for BLUETOOTH channel 18 to maximize an output power (e.g., an output power of 20 dBm instead of 10 dBm) while being compliant with regulations for output power. For instance, BLUETOOTH channel 18 between device 12 and device 14 may include 40 1 MHz wide channels that are separated by 2 MHz. In this example, rather than reserving some 40 1 MHz wide channels for advertising, all 40 1 MHz wide channels may be used to transmit data 19.

Device 12 and device 14 may authenticate using authentication information (e.g., a passkey) and/or encryption information (e.g., an encryption key) exchanged between device 12 and device 14 using wireless channel 16. For example, rather than a human user again validating the device to securely establish the BLUETOOTH channel, the device may use wireless channel 16 to exchange authentication information for the BLUETOOTH channel. In this example, in response to the authentication of device 12 and/or device 14, device 12 and device 14 may encrypt BLUETOOTH channel 18 using the encryption information.

BLUETOOTH channel 18 may operate at a higher bitrate than wireless channel 16. For example, communication circuitry 13 may establish wireless channel 16 for a first bitrate (e.g., less than 500 kbit/s, less than 250 kbit/s, less than 100 kbit/s, etc.) and establish the BLUETOOTH channel 18 for a second bitrate (e.g., more than 1 Mbps, more than 2 Mbps, more than 3 Mbps, more than 5 Mbps, more than 10 Mbps, more than 25 Mbps, etc.) that is greater than the first bitrate.

FIG. 2 is a conceptual block diagram illustrating a networked system 20, which may be one example of the networked system 10 of FIG. 1, in accordance with some examples of this disclosure. System 20 includes a central hub device 22, thermostat 24A, thermostat 24B (collectively, thermostats 24), indoor motion sensor 26A, outdoor motion sensor 26B (collectively, motion sensors 26), door/window contact sensor 28, air vent damper 36A, 36B, 36C (collectively, air vent dampers 36), smart doorbell 37, outdoor air sensor 38, outdoor infrared sensor 40A, indoor infrared sensor 40B (collectively, infrared sensors 40), router 33, and mobile device 32. While hub device 22 is shown as a distinct component, hub device 22 may be integrated into one or more of thermostats 24, motion sensors 26, door/window contact sensor 28, air vent dampers 36, smart doorbell 37, outdoor air sensor 38, and infrared sensors 40.

System 20 is a non-limiting example of the techniques of this disclosure. Other example systems may include more, fewer, or different components and/or devices. While FIG. 2 illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1X, 2G, 3G™ 4G™, 5G™, etc.), or another wireless broadband access.

Central hub device 22 may be in wireless data communication with thermostats 24, motion sensors 26, door/window contact sensor 28, air vent dampers 36, outdoor air sensor 38, and infrared sensors 40. For example, thermostats 24, motion sensors 26, door/window contact sensor 28, air vent dampers 36, outdoor air sensor 38, and infrared sensors 40 may be directly connected to hub device 22 using one or more wireless channels according to a connection protocol, such as, but not limited to, for example, IEEE 802.15.4, BLUETOOTH, or another connection protocol.

Each of thermostats 24, motion sensors 26, door/window contact sensor 28, air vent dampers 36, outdoor air sensor 38, and infrared sensors 40 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from hub device 22.

Although not shown in the example of FIG. 2, central hub device 22 may be in indirect wireless data communication (e.g., communication via an intermediary device) with one or more of thermostats 24, motion sensors 26, door/window contact sensor 28, air vent dampers 36, outdoor air sensor 38, and infrared sensors 40. For example, outdoor air sensor 38 may be indirectly connect thermostat to hub device 22 using a wireless channel according to a connection protocol, such as, but not limited to, for example, IEEE 802.15.4, BLUETOOTH, or another connection protocol. For instance, outdoor air sensor 38 may be connected to hub device 22 via thermostat 24A, outdoor infrared sensor 40A may be connected to hub device 22 via outdoor motion sensor 26B, etc.

Thermostats 24 may be configured to wirelessly transmit the temperature (e.g., sensor data) directly to hub device 22. Additionally, thermostats 24 may include controllable devices, in that they may activate or deactivate a heating, cooling, or ventilation system in response to receiving instructions from hub device 22. For example, thermostat 24A may collect temperature data and transmit the data to hub device 22. Hub device 22, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to hub device 22. Hub device 22 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

Door and/or window contact sensor 28 may include a security device configured to detect the opening of a door or window on which the device is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 22. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to hub device 12. For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content (e.g., a single image, a video stream, etc.) using a camera and/or audio content using a microphone. In this instance, smart doorbell 37 may output the video content and audio content to hub device 12, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to hub device 22. For instance, outdoor air sensor 38 may periodically output a current or average temperature to thermostats 24 via hub device 22.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to hub device 22. Hub device 22 may be configured to perform an action in response to receiving the sensor data, such as outputting an alert, such as a notification to mobile device 32, or by outputting a command for the respective passive infrared sensor 40 to output an audible or visual alert.

In accordance with the techniques of the disclosure, hub device 22 (e.g., a device with communication circuitry) and each of thermostats 24, motion sensors 26, door/window contact sensor 28, air vent dampers 36, smart doorbell 37, outdoor air sensor 38, and infrared sensors 40 (e.g., external devices) may exchange network parameters for a high-bandwidth channel. While various examples described herein use BLUETOOTH as an example of a high-bandwidth channel, in some examples, other high-bandwidth channels may be used, for example, an IEEE 802.11 channel.

For example, hub device 22 and thermostat 24A may establish a wireless channel according to a connection protocol (e.g., IEEE 802.15.4). In this example, hub device 22 and thermostat 24A may exchange network parameters for a BLUETOOTH channel. For instance, hub device 22 and thermostat 24A may exchange, via the wireless channel, one or more of: (1) a media access control (MAC) address of hub device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency.

Hub device 22 and thermostat 24A may authenticate using authentication information (e.g., a passkey) and/or apply encryption information (e.g., an encryption key) exchanged between device 12 and device 14 using wireless channel 16. For example, rather than a human user again validating hub device 22 and/or thermostat 24A to securely establish the BLUETOOTH channel, the device may use the wireless channel to exchange authentication information and/or encryption information for the BLUETOOTH channel.

Hub device 22 and thermostat 24A may establish the BLUETOOTH channel using the network parameters. In some examples, Hub device 22 and thermostat 24A may establish the BLUETOOTH channel using authentication information and/or encryption information for the BLUETOOTH channel. For example, hub device 22 and thermostat 24A may refrain from advertising network parameters for the BLUETOOTH channel and instead rely on the network parameters and optionally authentication information and/or encryption information for the BLUETOOTH channel exchanged using the wireless channel (e.g., IEEE 802.15.4). In this way, hub device 22 and thermostat 24A may establish a custom BLUETOOTH channel to setup a "BT stream" to occur, which allows for an output power that is compliant with local regulations and that maximizes a quality of service (e.g., speed, reliability, etc.) for transmitting data to and from the device on the BLUETOOTH compliant channels. Additionally, exchanging authentication information and/or encryption information for the BLUETOOTH channel on an encrypted and validated wireless channel (e.g., 802.15.4) may allow for the BLUETOOTH channel to be automatically authenticated and encrypted with less human interaction than systems that do not exchange authentication information and/or encryption information for the BLUETOOTH channel on the wireless channel.

Figure 3:
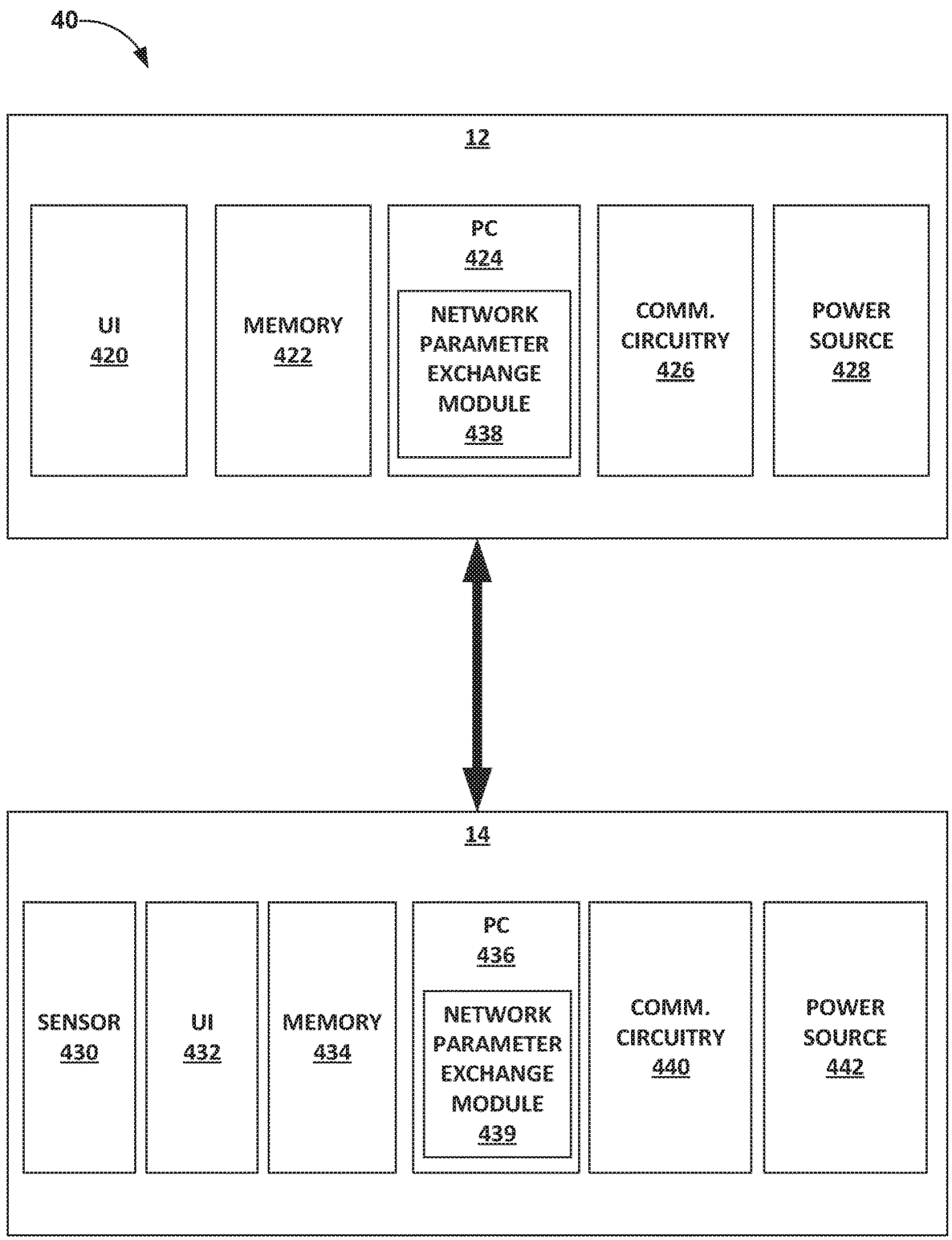
FIG. 3 is a conceptual block diagram of a plurality of networked comfort and/or security devices, in accordance with some examples of this disclosure.

FIG. 3 is a conceptual block diagram illustrating some example components of a system 40 of networked comfort and/or security devices, in accordance with some examples of this disclosure. System 40 may be an example of any of the previous systems 10, 20, or another system. System 40 includes central hub device 12 and device 14.

Central hub device 12 includes at least a user interface (UI) 420, a memory 422, processing circuitry (PC) 424, communication circuitry 426 ("COMM. CIRCUITRY"), and a power source 428. UI 420 is configured to receive data input from, or output data to, a user. For example, UI 420 may include a display screen, such as a touchscreen, keyboard, buttons, microphone, speaker, camera, or any other user input/output device. Other examples of UI 420 are possible. For example, during an initial setup process, hub device 12 may "scan" a local proximity in order to identify one or more other devices (e.g., devices having recognizable wireless communication capabilities), and then output for display on a display screen a list of discovered devices such that a user may select one or more of the devices to connect to. Via UI 420, a user may also specify one or more parameters in order to control or otherwise manage a comfort and/or security system within a building and the surrounding premises. For example, via UI 420, a user may specify one or more air temperature settings or security settings, such as access codes and/or authorized users.

Hub device 12 includes a memory 422 configured to store data, as well as instructions that, when executed by processing circuitry (PC) 424, cause hub device 12 to perform one or more techniques in accordance with this disclosure. Communication circuitry 426 ("COMM. CIRCUITRY") may include components, such as an antenna, configured to wirelessly transmit and receive data according to one or more wireless communication protocols. For example, communication circuitry 426 may be configured to transmit and/or receive data according to either or both of the IEEE 802.15.4 protocol and/or the BLUETOOTH protocol where appropriate, according to one or more constraints of the respective data communication protocols (e.g., communication range, energy requirements, etc.).

To exchange network parameters, communication circuitry 426 may be configured to transmit the network parameters and/or receive the network parameters. For example, communication circuitry 426 may be configured to transmit a request for the network parameters via the wireless channel (e.g., IEEE 802.15.4) and to device 14. In this example, communication circuitry 426 may receive the network parameters via the wireless channel and from device 14. In some examples, communication circuitry 426 may receive a request for the network parameters via the wireless channel and from device 14. In this example, communication circuitry 426 may output the network parameters via the wireless channel and to device 14.

Power source 428 may include a wired connection to an electric power grid, due to the energy-intensive operations performed by hub device 12. However, in some examples, power source 428 may additionally or alternatively include an internal power source, such as a battery or supercapacitor.

Device 14 includes a device configured to wirelessly communicate with hub device 12. Device 14 may include an incorporated sensor 430, a UI 432, a memory 434, processing circuitry (PC) 436, communication circuitry 440, and a power source 442. In some examples, device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples.

UI 430 is configured to receive data input from, or output data to, a user. For example, UI 430 may include a display screen, such as a touchscreen, keyboard, buttons, microphone, speaker, camera, or any other user input/output device. Other examples of UI 430 are possible. For example, during an initial setup process, device 14 may "scan" a local proximity in order to identify one or more hub devices and/or other devices (e.g., devices having recognizable wireless communication capabilities), and then output for display on a display screen a list of discovered devices such that a user may select one or more of the devices to connect to. Via UI 430, a user may also specify one or more parameters in order to control or otherwise manage a comfort and/or security system within a building and the surrounding premises. For example, via UI 430, a user may specify one or more air temperature settings (e.g., for a thermostat) or security settings, such as access codes and/or authorized users. Device 14 includes a memory 434 configured to store data, as well as instructions that, when executed by processing circuitry (PC) 436, cause device 14 to perform one or more techniques in accordance with this disclosure.

In accordance with the techniques of the disclosure, communication circuitry 426 and communication circuitry 440 may be configured to establish a wireless channel according to a connection protocol (e.g., IEEE 802.15.4). In this example, network parameter exchange module 438 of processing circuitry 424 and network parameter exchange module 439 of processing circuitry 436 may exchange network parameters for a BLUETOOTH channel. For instance, network parameter exchange module 438 and network parameter exchange module 439 may exchange, via the wireless channel, one or more of: (1) a media access control (MAC) address of hub device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency. For example, network parameter exchange module 438 and network parameter exchange module 439 may exchange, via the wireless channel, a MAC address for device 12 and a MAC address for device 14. In this example, communication circuitry 426 and communication circuitry 440 may be configured to establish a BLUETOOTH channel between the MAC address for device 12 and the MAC address for device 14.

Network parameter exchange module 438 and network parameter exchange module 439 may exchange, via the wireless channel, an indication of a particular time to establish the BLUETOOTH channel. In this example, communication circuitry 426 and communication circuitry 440 may be configured to establish the BLUETOOTH channel between device 12 and device 14 at the particular time.

For example, network parameter exchange module 438 and network parameter exchange module 439 may exchange, via the wireless channel, an indication of a starting frequency to establish the BLUETOOTH channel. In this example, communication circuitry 426 and communication circuitry 440 may be configured to establish a BLUETOOTH channel between device 12 and device 14 at the starting frequency. For instance, a BLUETOOTH channel LE between device 12 and device 14 may include 40 1 MHz wide channels that are separated by 2 MHz. In this example, the starting frequency may be an indication of a particular 1 MHz wide channel (e.g., channel 0, 1, . . . 39) and communication circuitry 426 and communication circuitry 440 may be configured to establish a BLUETOOTH channel between device 12 and device 14 at the particular 1 MHz wide channel.

Network parameter exchange module 438 and network parameter exchange module 439 may exchange, via the wireless channel, an indication of a hop set for the BLUETOOTH channel, the hop set indicating a sequence of frequencies. In this example, communication circuitry 426 and communication circuitry 440 may be configured to establish a BLUETOOTH channel between device 12 and device 14 to operate at the sequence of frequencies. For instance, a BLUETOOTH LE channel between device 12 and device 14 may include 37 1 MHz wide data channels and 3 advertising channels that are separated by 2 MHz. In this example, the sequence of frequencies may be an indication of an order for switching between the 1 MHz wide channels (e.g., channel 0, 1, . . . 37) and communication circuitry 426 and communication circuitry 440 may be configured to establish a BLUETOOTH channel between device 12 and device 14 that selects a 1 MHz wide channel according to the order for switching between the 1 MHz wide channels.

For example, network parameter exchange module 438 and network parameter exchange module 439 may exchange, via the wireless channel, an indication of a connection interval for the BLUETOOTH channel. In this example, communication circuitry 426 and communication circuitry 440 may be configured to establish a BLUETOOTH channel between device 12 and device 14 to operate at the connection interval. For instance, rather than exchanging data at any time on the BLUETOOTH channel between device 12 and device 14, the BLUETOOTH channel between device 12 and device 14 may be configured to initiate a transfer of data on BLUETOOTH channel between device 12 and device 14 at the connection interval.

Network parameter exchange module 438 and network parameter exchange module 439 may exchange, via the wireless channel, an indication of a connection latency for the BLUETOOTH channel. In this example, communication circuitry 426 and communication circuitry 440 may be configured to establish a BLUETOOTH channel between device 12 and device 14 to operate at the connection latency. For instance, rather than exchanging data at any time or at a connection interval on the BLUETOOTH channel between device 12 and device 14, the BLUETOOTH channel between device 12 and device 14 may be configured to initiate a transfer of data on BLUETOOTH channel between device 12 and device 14 at a latency interval of device 14 or device 12. This latency interval may be selected to reduce a time a radio of device 14 or device 12 listens for data (further from a connection interval), which may reduce a power consumption of device 14 or device 12 compared to systems that omit a latency interval or use a zero latency interval.

Network parameter exchange module 438 and network parameter exchange module 439 may exchange, via the wireless channel, an indication of antenna information for a plurality of antennas at the device. In this example, communication circuitry 426 and communication circuitry 440 may be configured to select a particular antenna from the plurality of antennas based on the antenna information and to establish a BLUETOOTH channel between device 12 and device 14 using the particular antenna.

In this example, communication circuitry 426 and communication circuitry 440 may be configured to establish the BLUETOOTH channel using the network parameters. For example, communication circuitry 426 and communication circuitry 440 may refrain from advertising network parameters for the BLUETOOTH channel and instead rely on the network parameters exchanged using the wireless channel (e.g., IEEE 802.15.4). In this way, communication circuitry 426 and communication circuitry 440 may establish a custom BLUETOOTH channel to setup a "BT stream" to occur, which allows for an output power that is compliant with local regulations and that maximizes a quality of service (e.g., speed, reliability, etc.) for transmitting data to and from the device on the BLUETOOTH compliant channels.

Network parameter exchange module 438 of processing circuitry 424 and network parameter exchange module 439 of processing circuitry 436 may be configured to exchange authentication information (e.g., a passkey) and/or encryption information (e.g., an encryption key) for the BLUETOOTH channel. For example, network parameter exchange module 438 and network parameter exchange module 439 may exchange, via the wireless channel, authentication information (e.g., a passkey) for device 12. In this example, communication circuitry 426 and communication circuitry 440 may be configured to authenticate a BLUETOOTH channel between device 12 and device 14 using the authentication information (e.g., the passkey). In some examples, network parameter exchange module 438 and network parameter exchange module 439 may exchange, via the wireless channel, encryption information (e.g., an encryption key for device 12 and/or an encryption key for device 14). For instance, communication circuitry 426 and communication circuitry 440 may be configured to encrypt and decrypt the BLUETOOTH channel between device 12 and device 14 using the encryption information (e.g., the encryption key for device 12 and/or the encryption key for device 14).

Figure 4:
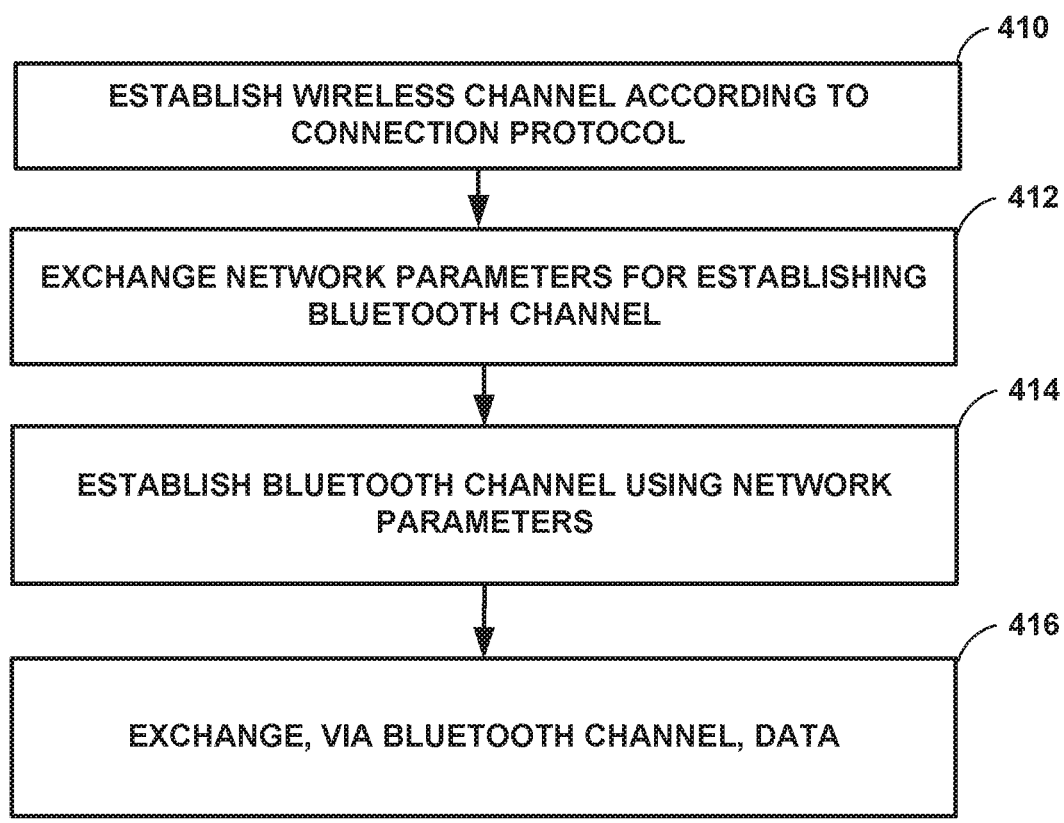
FIG. 4 is a flowchart illustrating example techniques for establishing a BLUETOOTH channel using a secondary wireless channel, in accordance with some examples of this disclosure.

FIG. 4 is a flowchart illustrating a process for communicating in a system for comfort or security in a building and the surrounding premises, in accordance with some examples of this disclosure. The examples of FIGS. 1A, 1, 2, and 3 are referred to for example purposes only. In accordance with the techniques of the disclosure, device 12 establishes, with device 14, a wireless channel according to a connection protocol (410). For example, communication circuitry 426 and communication circuitry 440 establish a wireless channel according to IEEE 802.15.4.

Device 12 exchanges, via the wireless channel and with external device 14, network parameters for establishing a BLUETOOTH channel (412). The BLUETOOTH channel is different from the wireless channel. For example, network parameter exchange module 438 and network parameter exchange module 439 exchange network parameters. For instance, network parameter exchange module 438 and network parameter exchange module 439 exchange one or more of (1) a media access control (MAC) address of hub device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency. In some examples, the BLUETOOTH channel is established according to a BLUETOOTH protocol different from the connection protocol. For instance, the BLUETOOTH channel is established using BLUETOOTH 5.0 and the connection protocol is IEEE 802.15.4. In some examples, device 12 may optionally exchange, via the wireless channel with external device 14, authentication information (e.g., a passkey) for the BLUETOOTH channel. Device 12 may optionally exchange, via the wireless channel with external device 14, encryption information (e.g., an encryption key) for the BLUETOOTH channel.

Device 12 establishes, with external device 14, the BLUETOOTH channel using the network parameters (414). For example, communication circuitry 426 and communication circuitry 440 establish the BLUETOOTH channel using the network parameters. In some examples, to establish the BLUETOOTH channel, communication circuitry 426 is configured to refrain from advertising the network parameters via the BLUETOOTH channel.

Device 12 may optionally establish, with external device 14, the BLUETOOTH channel using authentication information (e.g., a passkey) and/or encryption information (e.g., an encryption key) for the BLUETOOTH channel. For example, device 12 may optionally authenticate the BLUETOOTH channel using the authentication information (e.g., a passkey) exchanged via the wireless channel. Device 12 may optionally encrypt the BLUETOOTH channel using the encryption information (e.g., an encryption key) exchanged via the wireless channel.

Device 12 exchanges, via the BLUETOOTH channel and with the external device 14, data (418). For example, communication circuitry 426 and communication circuitry 440 exchange data over the BLUETOOTH channel setup using: (1) a media access control (MAC) address of hub device 22 and a MAC address of thermostat 24A; (2) a real time-point in time for the transfer to start (or offset from 802.15.4 start command); (3) an indication of a starting frequency; (4) an indication of a hop set; and (5) a connection interval that were previously exchanged via the wireless channel according to IEEE 802.15.4 and without advertising network parameters in the BLUETOOTH channel.

The following numbered examples demonstrate one or more aspects of the disclosure.

Example 1. A device comprising communication circuitry configured to: establish, with an external device, a wireless channel according to a connection protocol; exchange, via the wireless channel and with the external device, network parameters for establishing a BLUETOOTH channel that is different from the wireless channel, wherein the BLUETOOTH channel is established according to a BLUETOOTH protocol different from the connection protocol; establish, with the external device, the BLUETOOTH channel using the network parameters, wherein, to establish the BLUETOOTH channel, the communication circuitry is configured to refrain from advertising the network parameters via the BLUETOOTH channel; and exchange, via the BLUETOOTH channel and with the external device, data.

Example 2. The device of example 1, wherein the network parameters comprise a media access control (MAC) address for the device and a MAC address for the external device; and wherein, to establish the BLUETOOTH channel, the communication circuitry is configured to establish the BLUETOOTH channel between the MAC address for the device and the MAC address for the external device.

Example 3. The device of examples 1 or 2, wherein the network parameter comprises an indication of a particular time to establish the BLUETOOTH channel; and wherein, to establish the BLUETOOTH channel, the communication circuitry is configured to establish the BLUETOOTH channel at the particular time.

Example 4. The device of any of examples 1-3, wherein the network parameters comprise an indication of a starting frequency to establish the BLUETOOTH channel; and wherein, to establish the BLUETOOTH channel, the communication circuitry is configured to establish the BLUETOOTH channel at the starting frequency.

Example 5. The device of any of examples 1-4, wherein the network parameters comprise an indication of a hop set for the BLUETOOTH channel, the hop set indicating a sequence of frequencies; and wherein, to establish the BLUETOOTH channel, the communication circuitry is configured to establish the BLUETOOTH channel to operate at the sequence of frequencies.

Example 6. The device of any of examples 1-5, wherein the network parameters comprise an indication of a connection interval and a connection latency for the BLUETOOTH channel; and wherein, to establish the BLUETOOTH channel, the communication circuitry is configured to establish the BLUETOOTH channel to operate at the connection interval and the connection latency.

Example 7. The device of any of examples 1-6, wherein the network parameters comprise an indication of antenna information for a plurality of antennas at the device; and wherein, to establish the BLUETOOTH channel, the communication circuitry is configured to select a particular antenna from the plurality of antennas based on the antenna information and to establish the BLUETOOTH channel using the particular antenna.

Example 8. The device of any of examples 1-7, wherein, to exchange the network parameters, the communication circuitry is configured to: transmit a request for the network parameters via the wireless channel and to the external device; and receive the network parameters via the wireless channel and from the external device.

Example 9. The device of any of examples 1-8, wherein, to exchange the network parameters, the communication circuitry is configured to: receive a request for the network parameters via the wireless channel and from the external device; and output the network parameters via the wireless channel and to the external device.

Example 10. The device of any of examples 1-9, wherein the connection protocol is IEEE 802.15.4.

Example 11. The device of any of examples 1-10, wherein the connection protocol uses a 900 MHz frequency band.

Example 12. The device of any of examples 1-11, wherein the device comprises a hub device and the external device comprises a sensor device; or wherein the device comprises a sensor device and the external device comprises a hub device.

Example 13. The device of any of examples 1-12, wherein the BLUETOOTH protocol comprises BLUETOOTH low energy or classic BLUETOOTH.

Example 14. The device of any of examples 1-13, wherein, to establish the wireless channel, the communication circuitry is configured to establish the wireless channel for a first bitrate; and wherein, to establish the BLUETOOTH channel, the communication circuitry is configured to establish the BLUETOOTH for a second bitrate that is greater than the first bitrate.

Example 15. The device of any of examples 1-14, wherein the communication circuitry is configured to exchange, via the wireless channel and with the external device, authentication information, wherein, to establish the BLUETOOTH channel, the communication circuitry is configured to authenticate the BLUETOOTH channel using the authentication information.

Example 16. The device of any of examples 1-15, wherein the communication circuitry is configured to exchange, via the wireless channel and with the external device, encryption information, wherein, to establish the BLUETOOTH channel, the communication circuitry is configured to encrypt the BLUETOOTH channel using the encryption information.

Example 17. A method comprising: establishing, by communication circuitry of a device and with an external device, a wireless channel according to a connection protocol; exchanging, by the communication circuitry, via the wireless channel, and with the external device, network parameters for establishing a BLUETOOTH channel that is different from the wireless channel, wherein the BLUETOOTH channel is established according to a BLUETOOTH protocol different from the connection protocol; establishing, by the communication circuitry and with the external device, the BLUETOOTH channel using the network parameters, wherein, to establish the BLUETOOTH channel, the communication circuitry is configured to refrain from advertising the network parameters via the BLUETOOTH channel; and exchanging, by the communication circuitry, via the BLUETOOTH channel, and with the external device, data.

Example 18. The method of example 17, wherein the network parameters comprise a media access control (MAC) address for the device and a MAC address for the external device; and wherein establishing the BLUETOOTH channel comprises establishing the BLUETOOTH channel between the MAC address for the device and the MAC address for the external device.

Example 19. The method of any of examples 17 or 18, wherein the network parameters comprise an indication of a particular time to establish the BLUETOOTH channel; and wherein establishing the BLUETOOTH channel comprises establishing the BLUETOOTH channel at the particular time.

Example 20. A system comprising: a hub device; and a sensor device configured to generate sensor data; wherein the hub device comprises communication circuitry configured to: establish, with the sensor device, a wireless channel according to a connection protocol; exchange, via the wireless channel and with the sensor device, network parameters for establishing a BLUETOOTH channel that is different from the wireless channel, wherein the BLUETOOTH channel is established according to a BLUETOOTH protocol different from the connection protocol; establish, with the sensor device, the BLUETOOTH channel using the network parameters, wherein, to establish the BLUETOOTH channel, the communication circuitry is configured to refrain from advertising the network parameters via the BLUETOOTH channel; and receive, via the BLUETOOTH channel and with the sensor device, the sensor data.

The disclosure may be implemented using computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A device comprising communication circuitry configured to:
   establish, with an external device, a wireless channel according to a connection protocol;
   exchange, via the wireless channel and with the external device, network parameters for establishing a BLUETOOTH channel that is different from the wireless channel, wherein the BLUETOOTH channel is established according to a BLUETOOTH protocol different from the connection protocol;
   establish, with the external device, the BLUETOOTH channel using the network parameters, wherein, to establish the BLUETOOTH channel, the communication circuitry is configured to refrain from advertising the network parameters via the BLUETOOTH channel; and exchange, via the BLUETOOTH channel and with the external device, data.

2. The device of claim 1,
wherein the network parameters comprise a media access control (MAC) address for the device and a MAC address for the external device; and
wherein, to establish the BLUETOOTH channel, the communication circuitry is configured to establish the BLUETOOTH channel between the MAC address for the device and the MAC address for the external device.

3. The device of claim 1,
wherein the network parameter comprises an indication of a particular time to establish the BLUETOOTH channel; and
wherein, to establish the BLUETOOTH channel, the communication circuitry is configured to establish the BLUETOOTH channel at the particular time.

4. The device of claim 1,
wherein the network parameters comprise an indication of a starting frequency to establish the BLUETOOTH channel; and
wherein, to establish the BLUETOOTH channel, the communication circuitry is configured to establish the BLUETOOTH channel at the starting frequency.

5. The device of claim 1,
wherein the network parameters comprise an indication of a hop set for the BLUETOOTH channel, the hop set indicating a sequence of frequencies; and
wherein, to establish the BLUETOOTH channel, the communication circuitry is configured to establish the BLUETOOTH channel to operate at the sequence of frequencies.

6. The device of claim 1,
wherein the network parameters comprise an indication of a connection interval for the BLUETOOTH channel; and
wherein, to establish the BLUETOOTH channel, the communication circuitry is configured to establish the BLUETOOTH channel to operate at the connection interval.

7. The device of claim 1,
wherein the network parameters comprise an indication of antenna information for a plurality of antennas at the device; and
wherein, to establish the BLUETOOTH channel, the communication circuitry is configured to select a particular antenna from the plurality of antennas based on the antenna information and to establish the BLUETOOTH channel using the particular antenna.

8. The device of claim 1, wherein, to exchange the network parameters, the communication circuitry is configured to:
transmit a request for the network parameters via the wireless channel and to the external device; and
receive the network parameters via the wireless channel and from the external device.

9. The device of claim 1, wherein, to exchange the network parameters, the communication circuitry is configured to:
receive a request for the network parameters via the wireless channel and from the external device; and
output the network parameters via the wireless channel and to the external device.

10. The device of claim 1, wherein the connection protocol is IEEE 802.15.4.

11. The device of claim 1, wherein the connection protocol uses a 900 MHz frequency band.

12. The device of claim 1,
wherein the device comprises a hub device and the external device comprises a sensor device; or
wherein the device comprises a sensor device and the external device comprises a hub device.

13. The device of claim 1, wherein the BLUETOOTH protocol comprises BLUETOOTH low energy or classic BLUETOOTH.

14. The device of claim 1,
wherein, to establish the wireless channel, the communication circuitry is configured to establish the wireless channel for a first bitrate; and
wherein, to establish the BLUETOOTH channel, the communication circuitry is configured to establish the BLUETOOTH for a second bitrate that is greater than the first bitrate.

15. The device of claim 1, wherein the communication circuitry is configured to exchange, via the wireless channel and with the external device, authentication information, wherein, to establish the BLUETOOTH channel, the communication circuitry is configured to authenticate the BLUETOOTH channel using the authentication information.

16. The device of claim 1, wherein the communication circuitry is configured to exchange, via the wireless channel and with the external device, encryption information, wherein, to establish the BLUETOOTH channel, the communication circuitry is configured to encrypt the BLUETOOTH channel using the encryption information.

17. A method comprising:
establishing, by communication circuitry of a device and with an external device, a wireless channel according to a connection protocol;
exchanging, by the communication circuitry, via the wireless channel, and with the external device, network parameters for establishing a BLUETOOTH channel that is different from the wireless channel, wherein the BLUETOOTH channel is established according to a BLUETOOTH protocol different from the connection protocol;
establishing, by the communication circuitry and with the external device, the BLUETOOTH channel using the network parameters, wherein, to establish the BLUETOOTH channel, the communication circuitry is configured to refrain from advertising the network parameters via the BLUETOOTH channel; and
exchanging, by the communication circuitry, via the BLUETOOTH channel, and with the external device, data.

18. The method of claim 17,
wherein the network parameters comprise a media access control (MAC) address for the device and a MAC address for the external device; and
wherein establishing the BLUETOOTH channel comprises establishing the BLUETOOTH channel between the MAC address for the device and the MAC address for the external device.

19. The method of claim 17,
wherein the network parameters comprise an indication of a particular time to establish the BLUETOOTH channel; and
wherein establishing the BLUETOOTH channel comprises establishing the BLUETOOTH channel at the particular time.

20. A system comprising:
a hub device; and
a sensor device configured to generate sensor data;
wherein the hub device comprises communication circuitry configured to:
  establish, with the sensor device, a wireless channel according to a connection protocol;
  exchange, via the wireless channel and with the sensor device, network parameters for establishing a BLUETOOTH channel that is different from the wireless channel, wherein the BLUETOOTH channel is established according to a BLUETOOTH protocol different from the connection protocol;
  establish, with the sensor device, the BLUETOOTH channel using the network parameters, wherein, to establish the BLUETOOTH channel, the communication circuitry is configured to refrain from advertising the network parameters via the BLUETOOTH channel; and
  receive, via the BLUETOOTH channel and with the sensor device, the sensor data.

* * * * *